(No Model.)
G. CAMPAGNARI.
COOKING UTENSIL.
No. 301,090. Patented July 1, 1884.
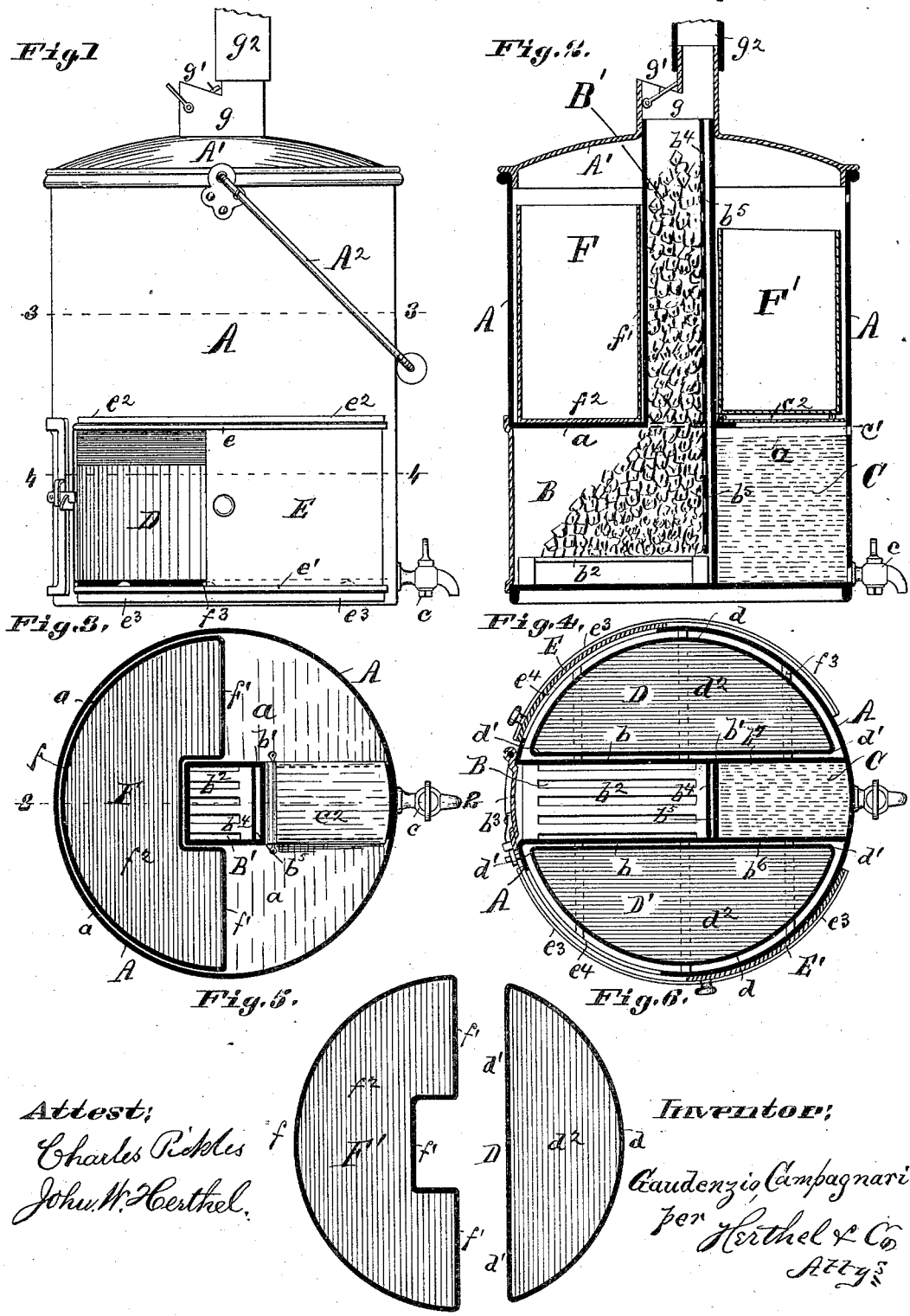
Attest:
Charles Pickles
John W. Herthel
Inventor:
Gaudenzio Campagnari
per Herthel & Co
Atty's

UNITED STATES PATENT OFFICE.

GAUDENZIO CAMPAGNARI, OF ST. LOUIS, MISSOURI.

COOKING UTENSIL.

SPECIFICATION forming part of Letters Patent No. 301,090, dated July 1, 1884.

Application filed February 1, 1883. (No model.)

*To all whom it may concern:*

Be it known that I, GAUDENZIO CAMPAGNARI, a subject to the King of Italy, residing at St. Louis and State of Missouri, have invented a new and useful Improved Cooking Utensil, of which the following is a specification.

The essential object of my invention is to combine with a dinner pail or bucket a central fire-place or heater surrounded with various compartments or chambers serviceable for broiling, roasting, stewing, and similar purposes, the entire apparatus constituting a new and improved portable range or cooking utensil, as will now more fully appear. I attain these objects by the mechanism illustrated in the accompanying drawings, in which—

Figure 1 is a side elevation with one of the slide-doors partly open. Fig. 2 is a central sectional elevation. Fig. 3 is a plan section taken on line 3 3. Fig. 4 is a plan section taken on line 4 4, and Figs. 5 and 6 are respective detail plan views to show the shape of the upper and lower pans used.

Similar letters refer to similar parts throughout the several views.

My invention is here presented as a dinner pail or bucket having my improvements applied thereto, as follows:

A represents the bucket or sheet-iron casing, and preferably made in the cylindrical form, as shown. A' is the cover or lid. $A^2$ is the bail or handle. I divide the bucket or cylindrical casing into an upper and a lower chamber by means of a partition or bottom, $a$. (See Figs. 2, 3.) The lower chamber has the fire-chamber B, and the hot-water chamber C, and the remaining portion of said lower chamber contains the lower pans, D D'. (See Figs. 1, 2, 4.) The fire-chamber consists of the side walls, $b\ b$, and rear wall, $b'$, the grate-bars $b^2$, ash-pit, &c. (See Figs. 1, 2, 3, 4.) $b^3$ is the hinged door leading to the fire or grate chamber. B' is the fuel-chamber, and extends, like a flue, from the top of the fire-chamber centrally through the bucket or casing A, as shown in Figs. 2, 3. It is down this fuel-chamber B' that the coal, &c., is fed or charged to the fire—that is to say, rendered self-feeding, like a magazine-stove—supplying coal to the fire as that in the fire-grate burns away. (See Fig. 2.) $b^4$ is a perforated metal wall extending down the fuel-chamber B', and secured a slight distance away from the rear wall, so as to form the draft-chamber $b^5$. (See Figs. 2, 3, 4.) The draft is from the front of the fire-chamber B up through the fuel-chamber B' and through the perforations $b^4$ into chamber $b^5$ and upward out of same into smoke pipe or stack. By means of this construction the entire mass of fuel is ignited; but as the larger portion is contained in the fire-chamber proper the lower part of the utensil receives the most heat. The hot-water chamber C is on the opposite side of the rear wall, $b'$, and has the side walls, $b^6\ b^7$. (See Figs. 2, 4.) $c$ is the discharge-cock. $c'$ is the vent at top of hot-water chamber. $c^2$ is its hinged lid or cover. (See Figs. 2, 3.) The water is emptied into the chamber C from the top by lifting off the cover A' of the apparatus. The remaining portion of the lower chamber contains the pans D D'—one on each side of the hot-water and fire chambers, so as to receive the advantages of the heat from said chambers. These pans are simply open-top vessels, each having the curved side $d$, the opposite straight side, $d'$, and bottom $d^2$, this shape fitting the pans to correspond to the shape of the chamber part in which they are inclosed. (See Figs. 1, 4, 6.) To insert or remove the two lower pans, D D', into and out of their chambers the bucket or casing is provided with two slide-doors—one on each side. E E' are these slide-doors, shaped to correspond to the side of the casing they are to close. (See Figs. 1, 4.) The slide-doors have the upper and lower flanges or edges, $e\ e'$. These fit into grooves at $e^2\ e^3$, which form part of the casing; hence each door can be drawn back to open or drawn forward to close the opening $e^4$ for purposes of getting at the inside of the lower chamber or to manipulate the lower pans.

In the upper chamber-top of the bottom $a$, I place the upper pan or pans, F F'. (See Figs. 2, 3.) These pans are also open-top vessels, their sides $f\ f'$ shaped to fit the cylinder side; also the square-shaped fuel-chamber B'. $f^2$ is the bottom of the pans F. By removing the cover A' the upper pan or pans can be placed in their places, resting simply upon the bottom $a$, and receiving the benefit of the heat generated in the fire-chamber. The lower pans rest upon a grating or grid-iron, (indicated by $f^3$ in Figs. 1 and 4.)

On top of the cover A' is the short flue $g$, which at $g'$ has a hinged door, and to the remaining part of said flue a stove-pipe, $g^2$, can be added. (See Figs. 1 and 2.)

The top of the fuel chamber or flue B' fits snugly into the flue of the cover when the latter is in place, to close the top of the cooking apparatus. The fuel is placed in the fuel-chamber B', (by opening the door $g'$,) and when the fire is started in the combustion-chamber B the draft is upward into the draft-chamber $b^5$ and out of the smoke-pipe. The products of combustion, smoke, &c., pass up the flue B' into its extension $g$, out of smoke-pipe $g^2$.

Broiling, roasting, baking, &c., can be done in the lower pans, D D'. Stewing and other light cooking can be done in the upper pans.

The mode of operation is substantially as follows: The fuel-chamber B having been supplied with fuel, the fire may be started in the usual manner. When well under way, the upper fuel-chamber, B', may be supplied with a greater or less amount of fuel, according to the requirements of the case, fresh fuel being added through the top when more is required. The entire mass of fuel being ignited by the draft through the usual openings and the perforated wall $b^4$, a great deal of heat may be obtained when desired. The construction of my cooking apparatus is therefore such that it is serviceable for purposes of a stationary as well as portable range, hence adapted for markets, restaurants, bar-rooms, and household purposes. It is specially serviceable as a portable range. Since the fuel is kept supplied to the fire, the heat is distributed to any chamber or pan, enabling cooking, &c., to be carried on at any or all hours.

What I claim is—

1. The range or cooking apparatus consisting of the casing A, having partition $a$, the fire-chamber B, the fuel-chamber B', having the perforated wall $b^4$, draft-chamber $b^5$, cover A', having chimney-flue $g$, and door $g'$, as and for the purposes set forth.

2. The range or cooking apparatus consisting of the casing or housing A, its partition $a$, the slide-doors E E', the fire-chamber B, the fuel-chamber B', having the perforated wall $b^4$, draft-chamber $b^5$, the hot-water chamber C, with the upper and lower pans, F F' and D D', the cover A', having chimney-flue $g$, door $g'$, and flue-extension $g^2$, all constructed as herein shown and described, as and for the purposes set forth.

In testimony of said invention I have hereunto set my hand.

GAUDENZIO CAMPAGNARI.

In presence of—
  WILLIAM W. HERTHEL,
  PETER A. RUGA.